(12) United States Patent
Echigo et al.

(10) Patent No.: US 12,726,927 B2
(45) Date of Patent: Sep. 1, 2026

(54) TERMINAL, RADIO COMMUNICATION SYSTEM, AND RADIO COMMUNICATION METHOD

(71) Applicant: NTT DOCOMO, INC., Tokyo (JP)

(72) Inventors: Haruhi Echigo, Tokyo (JP); Shohei Yoshioka, Tokyo (JP); Daisuke Kurita, Tokyo (JP); Shinya Kumagai, Tokyo (JP); Yuki Takahashi, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 297 days.

(21) Appl. No.: 18/580,393

(22) PCT Filed: Jul. 21, 2021

(86) PCT No.: PCT/JP2021/027387
§ 371 (c)(1),
(2) Date: Jan. 18, 2024

(87) PCT Pub. No.: WO2023/002625
PCT Pub. Date: Jan. 26, 2023

(65) Prior Publication Data
US 2024/0340826 A1 Oct. 10, 2024

(51) Int. Cl.
*H04W 56/00* (2009.01)
*H04L 5/00* (2006.01)
*H04W 8/22* (2009.01)

(52) U.S. Cl.
CPC ....... *H04W 56/0045* (2013.01); *H04L 5/0051* (2013.01); *H04W 8/22* (2013.01)

(58) Field of Classification Search
None
See application file for complete search history.

(56) References Cited

U.S. PATENT DOCUMENTS

2013/0250911 A1* 9/2013 Kwon ............... H04W 36/0055 370/336
2018/0084546 A1* 3/2018 Guo .................. H04W 72/0446
2022/0337370 A1* 10/2022 Wang .................... H04L 5/0092
2023/0188283 A1* 6/2023 Liu ................... H04W 72/0453 370/329
2023/0239823 A1* 7/2023 Liu ................... H04W 56/0045 370/350

FOREIGN PATENT DOCUMENTS

CN 112511281 A 3/2021
EP 4 231 570 A1 8/2023
(Continued)

OTHER PUBLICATIONS

3GPP TS 38.211 V16.6.0; "3rd Generation Partnership Project; Technical Specification Group Radio Access Network; NR; Physical channels and modulation (Release 16)"; Jun. 2021 (134 pages).
(Continued)

*Primary Examiner* — Clemence S Han
(74) *Attorney, Agent, or Firm* — Osha Bergman Watanabe & Burton LLP

(57) ABSTRACT

A terminal transmits an uplink signal through an uplink and controls transmission timing of the uplink signal. The terminal configures different timing values for each of a plurality of uplink signals transmitted within the same cell.

4 Claims, 8 Drawing Sheets

| Index | TA value |
| --- | --- |
| 1 | TA · 16 · $64/2^{\mu}$ (TA=3) |
| 2 | TA · 16 · $64/2^{\mu}$ (TA=5) |
| 3 | TA · 16 · $64/2^{\mu}$ (TA=7) |

PUCCH-spatial relation info

PUCCH-spatial relation info ID: 1
TA value index: 1

PUCCH-spatial relation info ID: 2
TA value index: 3

(56) References Cited

FOREIGN PATENT DOCUMENTS

| | | | |
|---|---|---|---|
| JP | 2017-152911 | A | 8/2017 |
| JP | 2018-074584 | A | 5/2018 |
| WO | 2020/121497 | A1 | 6/2020 |

OTHER PUBLICATIONS

NTT DOCOMO;"White Paper 5G Evolution and 6G Feb. 2021 (Version 3.0", Feb. 2021; Retrieved from Internet: URL:https://www.nttdocomo.co.jp/corporate/technology/whitepaper_6g/ (38 pages).

International Search Report issued in corresponding International Application No. PCT/JP2021/027387, mailed on Jan. 25, 2022 (5 pages).

Written Opinion issued in corresponding International Application No. PCT/JP2021/027387, mailed on Jan. 25, 2022 (4 pages).

Notice of Reasons for Refusal issued in Japanese Patent Application No. 2023-536310, mailed May 20, 2025 (7 pages).

* cited by examiner

Figure 4:
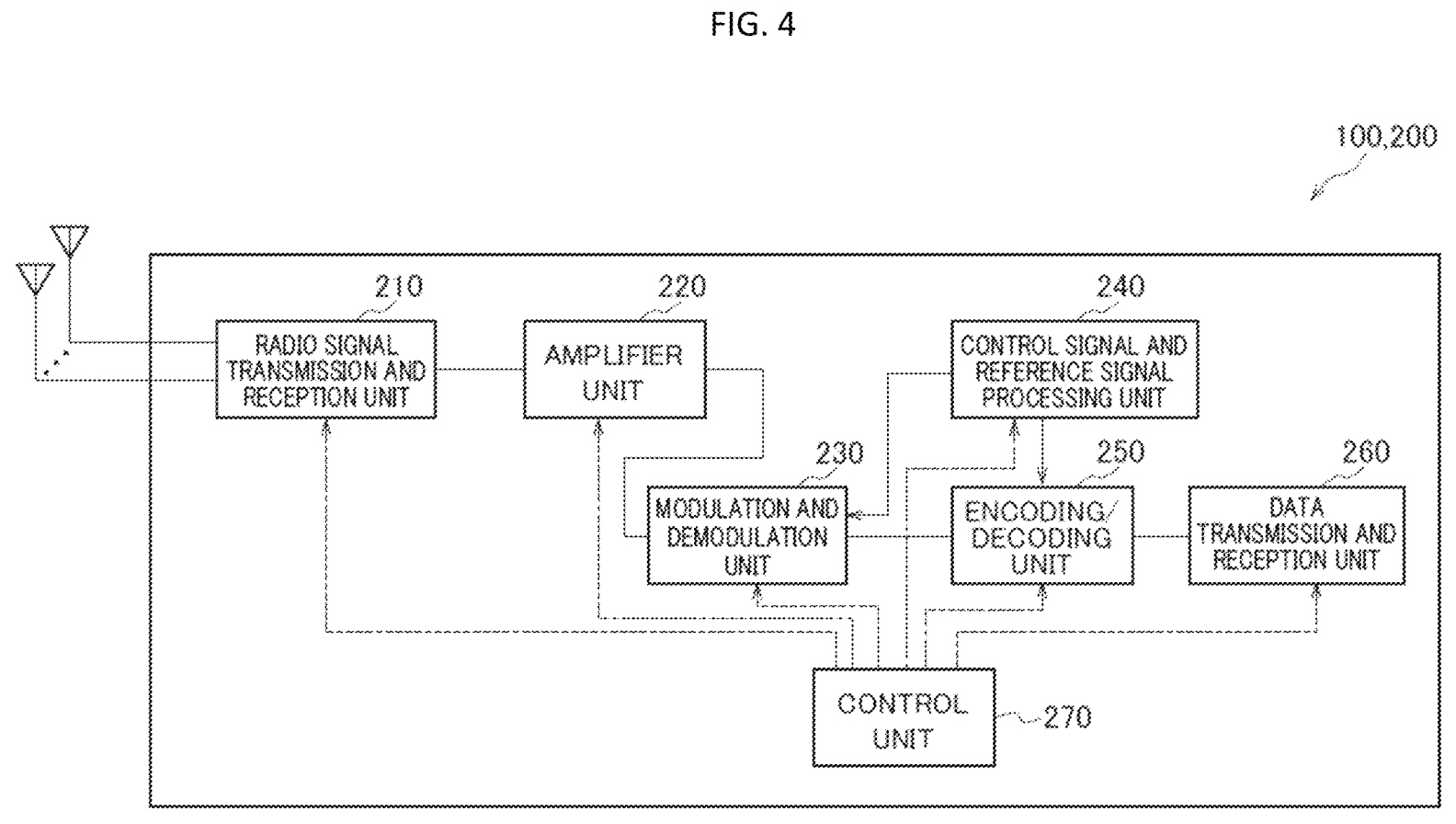

210 RADIO SIGNAL TRANSMISSION AND RECEPTION UNIT

220 AMPLIFIER UNIT

230 MODULATION AND DEMODULATION UNIT

240 CONTROL SIGNAL AND REFERENCE SIGNAL PROCESSING UNIT

250 ENCODING/ DECODING UNIT

260 DATA TRANSMISSION AND RECEPTION UNIT

270 CONTROL UNIT

TA value ($N_{TA}$/ $N_{TA,offset}$/ $N_{TA}$ + $N_{TA,offset,}$/ $(N_{TA}+ N_{TA,offset})T_c$ / TA offset)

| Index | TA value |
|---|---|
| 1 | TA · 16 · 64/$2^{\mu}$ (TA=3) |
| 2 | TA · 16 · 64/$2^{\mu}$ (TA=5) |
| 3 | TA · 16 · 64/$2^{\mu}$ (TA=7) |

TERMINAL, RADIO COMMUNICATION SYSTEM, AND RADIO COMMUNICATION METHOD

BACKGROUND OF THE INVENTION

Technical Field

The present disclosure relates to a terminal, a radio communication system, and a radio communication method.

Background

The 3rd Generation Partnership Project (3GPP) has prepared a specification for the 5th generation mobile communication system (which may referred to as 5G, New Radio (NR) or Next Generation (NG)) and is also in the process of preparing specification of a next generation system called "Beyond 5G", "5G Evolution" or "6".

For example, in Release 15 and Release 16 (NR) of 3GPP, a terminal (User Equipment, UE) can perform a control to shift a start position of a radio frame in an uplink (UL) and a downlink (DL) (see non-patent document 1). Specifically, the UE can change transmission timing of a UL frame based on a Timing Advance (TA) value (TA value).

Next generation specifications, such as 6G, are taking into consideration an introduction of radio communications using a reflector (Reconfigurable Intelligent Surface: RIS) to improve various radio performances while controlling reflection or transmission of radio waves to form an area by attaching it to a wall or a window pane, and the like, and far more number of transmission and reception points (Multi-TRP) (Non-Patent Document 2).

PRIOR ART DOCUMENTS

Non-Patent Documents

Non-patent document 1: 3GPP TS 38.211 V16.6.0, 3rd Generation Partnership Project; Technical Specification Group Radio Access Network; NR; Physical channels and modulation (Release 16), 3GPP, June 2021

Non-Patent Document 2: NTT DOCOMO, "DOCOMO 6G Whitepaper 3.0 Version," [online], February 2021, Internet <URL: https://www.nttdocomo.co.jp/corporate/technology/whitepaper_6 g/>

SUMMARY OF THE INVENTION

An introduction of a RIS and a Multi-TRP is expected to increase the number of Line of Sight (LOS) paths in each section of the TRP (which may include UEs)-RIS-TRP. For example, going through the RIS increases the probability that there will be paths with high latency but sufficient received power.

However, since the timing value (TA value) used to adjust the transmission timing of the uplink is fixed to a single value within the same cell, there may be cases where the increase in the paths resulting in the LOS cannot be fully accommodated.

Accordingly, the following disclosure has been made in light of this situation, and is intended to provide a terminal, a radio communication system, and a radio communication method capable of configuring an appropriate timing value even when the LOS paths increase.

An aspect of the present disclosure is a terminal (UE 200) including a transmitting unit (radio signal transmission/reception unit 210) for transmitting an uplink signal through an uplink, and a control unit (control unit 270) for controlling transmission timing of the uplink signal, in which the control unit configures different timing values for each of a plurality of the uplink signals transmitted in the same cell.

An aspect of the present disclosure is a terminal (UE 200) including a transmitting unit (radio signal transmission/reception unit 210) for transmitting an uplink signal through an uplink, and a control unit (control unit 270) for controlling transmission timing of the uplink signal, in which the control unit configures different timing values for each destination of the uplink signal or for each transmission panel that transmits the uplink signal.

An aspect of the present disclosure is a terminal (UE 200) including a transmitting unit (radio signal transmission/reception unit 210) for transmitting an uplink signal through an uplink, and a control unit (control unit 270) for controlling transmission timing of the uplink signal, in which the control unit configures different timing values for each time resource.

An aspect of the present disclosure is a radio communication system (radio communication system 10) including a terminal and a radio base station, in which the terminal includes a transmitting unit (radio signal transmission/reception unit 210) for transmitting an uplink signal through an uplink, and a control unit (control unit 270) for controlling transmission timing of the uplink signal, in which the radio base station includes a receiving unit for receiving the uplink signal, and in which the control unit configures different timing values for each of a plurality of the uplink signals transmitted within the same cell.

An aspect of the present disclosure is a radio communication method including a transmission step for transmitting an uplink signal through an uplink and a control step for controlling transmission timing of the uplink signal, in which in the control step, different timing values are configured for each of a plurality of the uplink signals transmitted within the same cell.

An aspect of the present disclosure is a terminal (UE 200) including a transmitting (radio unit signal transmission/reception unit 210) for transmitting an uplink signal through an uplink and a control unit (control unit 270) for controlling transmission timing of the uplink signal, in which the control unit configures a timing value of the uplink signal based on a reference signal referred to in the transmission of the uplink signal.

An aspect of the present disclosure is a terminal (UE 200) including a transmitting unit (radio signal transmission/reception unit 210) for transmitting an uplink signal through an uplink and a control unit (control unit 270) for controlling transmission timing of the uplink signal, in which the control unit configures a timing value of the uplink signal based on a spatial relation with the uplink signal.

An aspect of the present disclosure is a terminal (UE 200) including a transmitting unit (radio signal transmission/reception unit 210) for transmitting an uplink signal through an uplink, and a control unit (control unit 270) for controlling transmission timing of the uplink signal, in which the control unit configures a timing value of the uplink signal based on a content of downlink control information.

An aspect of the present disclosure is a radio communication system (radio communication system 10) including a terminal and a radio base station, the terminal including a transmitting unit for transmitting an uplink signal through an uplink, and a control unit for controlling transmission timing of the uplink signal (control unit 270), in which the control unit configures a timing value of the uplink signal based on a reference signal referred to in the transmission of the uplink signal.

An aspect of the present disclosure is a radio communication method including a step of transmitting an uplink signal through an uplink and a step of controlling transmission timing of the uplink signal, in which in the step of controlling, a timing value of the uplink signal is configured based on a reference signal referred to in the transmission of the uplink signal.

BRIEF DESCRIPTION OF DRAWINGS

FIG. 4 is a functional block configuration diagram of a gNB 100 and a UE 200.

DETAILED DESCRIPTION OF THE INVENTION

Figure 1:
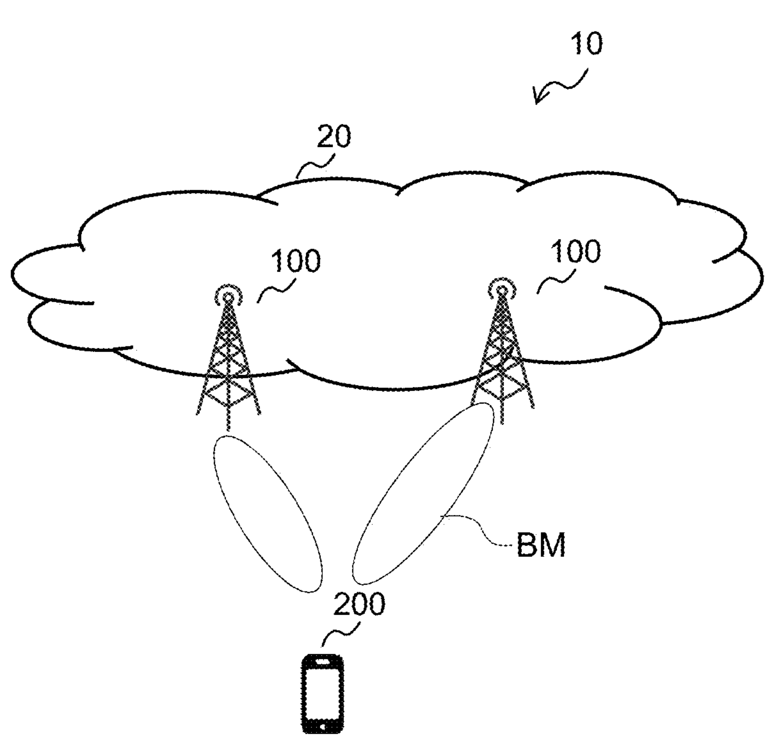
FIG. 1 is a general schematic configuration diagram of a radio communication system 10.

Hereinafter, embodiments will be described based on the drawings. The same functions and configurations are denoted by the same or similar reference numerals, and the description thereof will be omitted as appropriate.

(1) Overall Schematic Configuration of Radio Communication System

FIG. 1 is an overall schematic configuration of a radio communication system 10 according to the present embodiment. The radio communication system 10 is a radio communication system in accordance with 5G New Radio (NR) and includes a Next Generation-Radio Access Network 20 (hereinafter referred to as NG-RAN 20) and a terminal 200 (user Equipment 200, hereinafter referred to as UE 200).

The radio communication system 10 may be a radio communication system in accordance with a mode called "Beyond 5G", "5G Evolution" or "6".

The NG-RAN 20 includes a radio base station 100 (hereinafter referred to as a gNB 100). The specific configuration of the radio communication system 10 including the number of the gNBs and the UEs is not limited to the example shown in FIG. 1.

The NG-RAN 20 practically includes a plurality of NG-RAN Nodes, specifically gNBs (or ng-eNBs), and is connected to a core network in accordance with 5G (5GC, not illustrated). The NG-RAN 20 and the 5GC may be referred to simply as "network."

The gNB 100 is a radio base station in accordance with the NR, and performs a radio communication with the UE 200 in accordance with the NR. The gNB 100 and the UE 200 can support Massive MIMO which generates a more directional beam BM, a carrier aggregation (CA) which uses a plurality of component carriers (CCs) bundled together, and dual connectivity (DC) which simultaneously performs a communication between the UE and each of a plurality of the NG-RAN Nodes, and the like by controlling radio signals transmitted from a plurality of antenna elements.

The radio communication system 10 corresponds to FR1 and FR2. The frequency band of each Frequency Range (FR) is as follows.

FR1: 410 MHz-7.125 GHZ

FR2: 24.25 GHz-52.6 GHz

FR1 uses Sub-Carrier Spacing (SCS) of 15, 30 or 60 kHz and may use a bandwidth (BW) of 5-100 MHz. FR2 has a higher frequency than FR1 and may use SCS of 60 or 120 kHz (240 KHz may be included.) and may use a bandwidth (BW) of 50-400 MHZ.

In addition, the radio communication system 10 may support higher frequency bands than those of FR2. Specifically, the radio communication system 10 can support frequency bands greater than 52.6 GHZ and up to 114.25 GHz. FR2 may also include FR2-1 (24.25-52.6 GHZ) and FR2-2 (52.6-71 GHZ).

Cyclic Prefix-Orthogonal Frequency Division Multiplexing (CP-OFDM)/Discrete Fourier Transform-Spread (DFT-S-OFDM) with greater Sub-Carrier Spacing (SCS) may also be applied. Furthermore, DFT-S-OFDM may be applied not only to an uplink (UL) but also to a downlink (DL).

Figure 2:
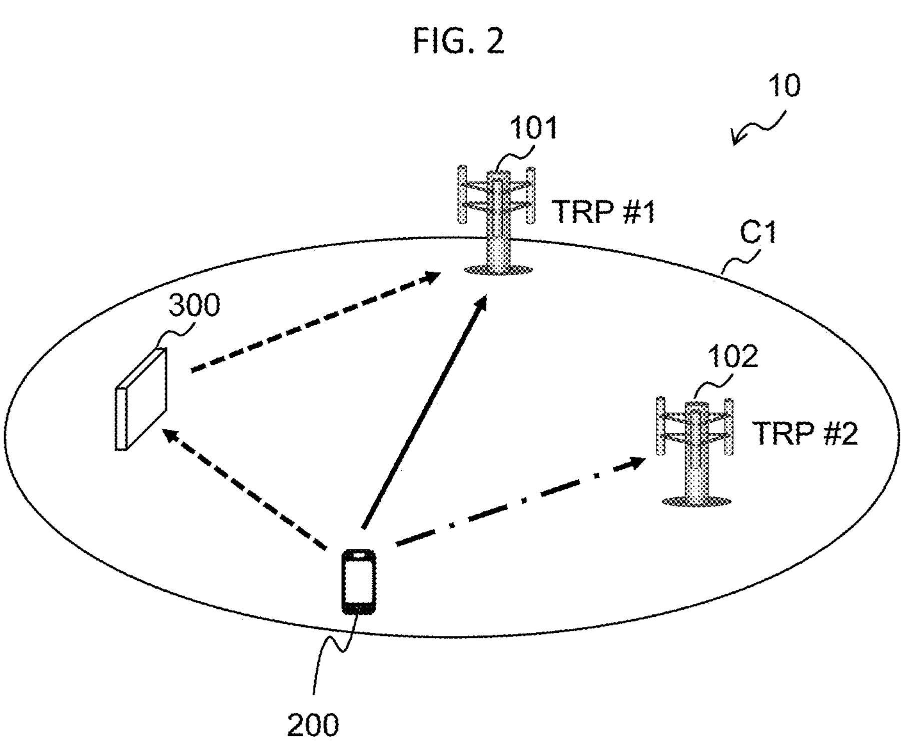
FIG. 2 is a diagram showing a configuration example of a path between a UE 200 and a transmission/reception point (TRP).

FIG. 2 shows a configuration example of a path between a UE 200 and a transmission/reception point (TRP). As shown in FIG. 2, the radio communication system 10 may include a plurality of transmission/reception points (TRP), specifically a TRP 101, a TRP 102, and a RIS 300. The number of TRPs and RISs included in the radio communication system 10 is not particularly limited. The TRP 101 and TRP 102 (which may be interpreted as a gNB 100) can form a cell C1. The cell C1 may be a serving cell of the UE 200.

The TRP 101 and the TRP 102 may be interpreted as components of the gNB 100. The TRP 101 and the TRP 102 may be located in geographically different locations. The TRP 101 and the TRP 102 may be interpreted as synonymous with antenna devices, antenna panels, transmission panels, panels, and the like. The TRP 101 and the TRP 102 may form a beam BM (see FIG. 1) directed in a predetermined direction. The UE 200 may also have a plurality of the transmission panels.

The RIS 300 (Reconfigurable Intelligent Surface) may be interpreted as a type of reflector that improves various radio performances while controlling the reflection or transmission of radio waves to form an area by attaching it to a wall, window pane, and the like. The RIS 300 can improve distributed antenna deployment (Multi-TRP) in which a large number of antenna devices are deployed in a distributed manner, and radio performances, and the like.

In addition to the reflector, the RIS 300 may be referred to as a battery-less device, a metamaterial functional device, an Intelligent Reflecting Surface (IRS), a smart repeater, and the like.

The RIS 300 may have, for example, the following functions.

(UE Function)

A function of receiving signals sent from the radio base stations (Examples: downlink (DL) signal, SS Block (SSB), Physical Downlink Control Channel (PDCCH), Physical Downlink Shared Channel (PDSCH), DeModulation Reference Signal (DM-RS), Phase Tracking Reference Signal (PT-RS), Channel Status Information Reference Signal (CSI-RS), RIS-dedicated signal)

This may include receiving information about the following metamaterial functions:

A function of transmitting signals to the radio base station (Examples: uplink (UL) signal, Random Access Channel Preamble (PRACH), Physical Uplink Control Channel (PUCCH), Physical Uplink Control Channel (PUSCH), DM-RS, PT-RS, Sounding Reference Signal (SRS), RIS-dedicated signal)

This may include transmitting information about the following metamaterial functions:

A function of a frame synchronization with a radio base station (Metamaterial Function)

A function of reflecting signals sent from a radio base station or a UE (e.g., a phase change)

A function related to a beam control (Examples: Transmission Configuration Indication (TCI)-state, a function of controlling Quasi Co-Location (QCL), selection and application of a beam, selection and application of a spatial filter/precoding weight)

A power change function for signals transmitted from a radio base station or an UE (Example: power amplification)

In addition, "receive and transmit" or "relay" in the RIS 300 may mean that up to the following predetermined function A is performed and a transmission is performed without the following predetermined function B being performed.

A: a phase shifter is applied, but B: a compensation circuit (for example, amplification, a filter) is not involved.

A: a phase shifter and a compensation circuit are applied, but B: frequency conversion is not involved.

Amplitude of the RIS 300 may be amplified when a phase changes. "Relay" may mean transmitting a received signal as is without performing any processing at a layer 2/3 level, transmitting the received signal as is at a physical layer, or transmitting the received signal as is without signal interpretation (At this time, a phase change or amplitude amplification may be performed.).

Figure 3:
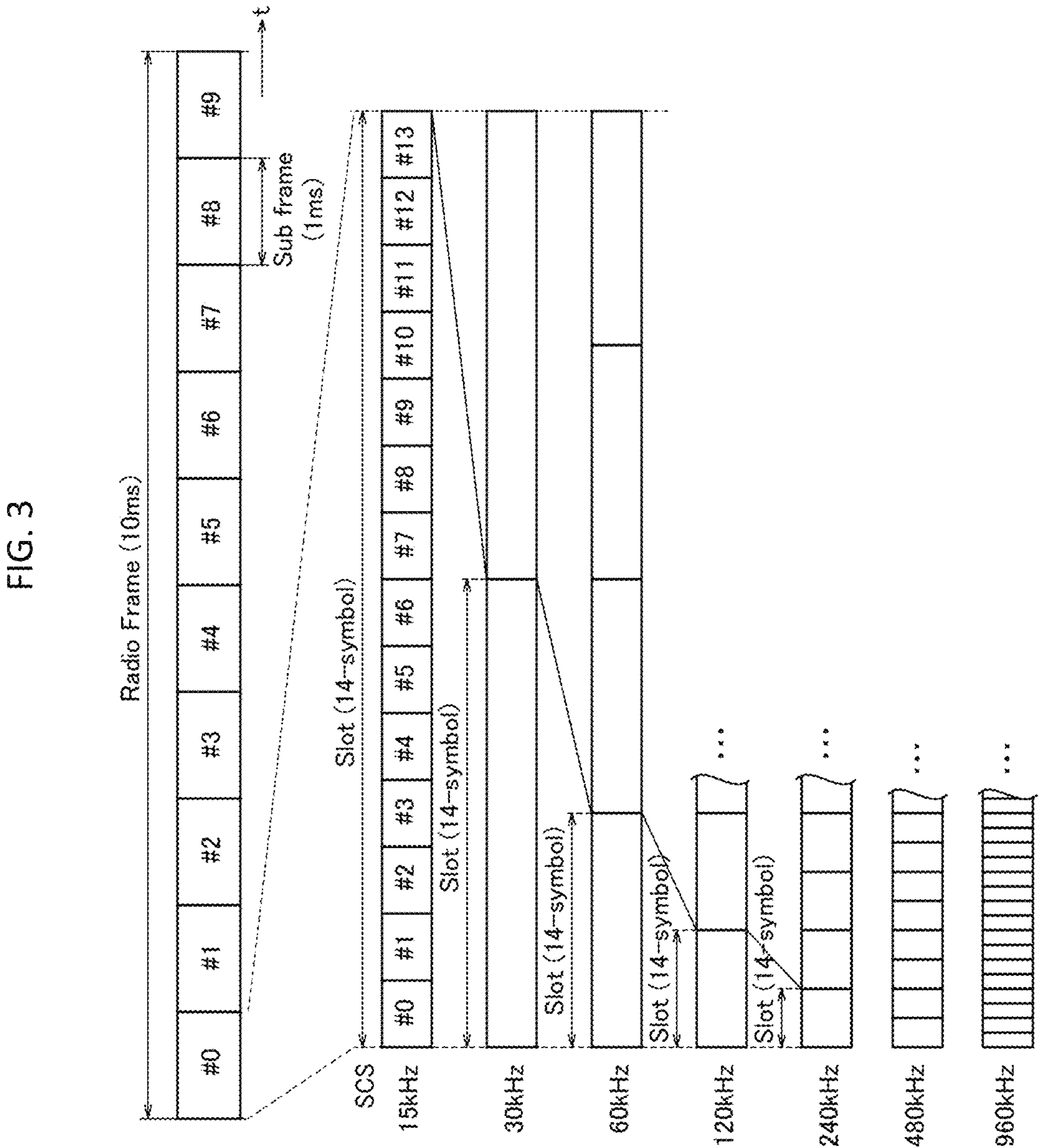
FIG. 3 is a diagram showing a configuration example of a radio frame, a sub-frame and a slot used in a radio communication system 10.

FIG. 3 shows a configuration example of a radio frame, a sub-frame, and a slot used in a radio communication system 10.

As shown in FIG. 3, a slot includes 14 symbols, and the larger (wider) the SCS, the shorter a symbol period (and a slot period). Note that the number of the symbols constituting a slot may not necessarily be 14 symbols (for example, 28, 56 symbols). The number of slots per sub-frame may vary depending on the SCS. In addition, the SCS may be wider than 240 kHz (for example, 480 kHz, 960 kHz as shown in FIG. 2).

Note that a time direction (t) shown in FIG. 3 may be referred to as a time domain, a time resource, a symbol period or a symbol time. A frequency direction may be referred to as frequency domain, frequency resource, resource block, sub-carrier, Bandwidth part (BWP) or the like.

(2) Function Block Configuration of a Radio Communication System

Next, a function block configuration of the radio communication system 10 will be described. Specifically, the function block configuration of the UE 200 will be described. FIG. 4 is a function block configuration diagram of the gNB 100 and the UE 200.

As shown in FIG. 4, the UE 200 includes a radio signal transmission/reception unit 210, an amplifier unit 220, a modulation/demodulation unit 230, a control signal/reference signal processing unit 240, an encoding/decoding unit 250, a data transmission/reception unit 260, and a control unit 270.

It should be noted that only main functional blocks relevant to the description of the embodiments are shown in FIG. 4, and the UE 200 (gNB 100) has other functional blocks (Examples include a power supply unit). FIG. 4 also shows the functional block configuration of the UE 200, and regarding the hardware configuration, FIG. 12 should be referred to.

The radio signal transmission/reception unit 210 transmits/receives radio signals in accordance with the NR. By controlling radio (RF) signals transmitted from a plurality of antenna elements, the radio signal transmission/reception unit 210 can support Massive MIMO, which generates a beam with higher directivity, carrier aggregation (CA), which uses a plurality of component carriers (CCs) bundled together, and dual connectivity (DC), which simultaneously communicates between a UE and each of two NG-RAN nodes.

The radio signal transmission/reception unit 210 transmits an uplink signal through an uplink (UL) and receives a downlink signal through a downlink (DL). In this embodiment, the radio signal transmission/reception unit 210 may constitute a transmitting unit for transmitting an uplink signal through an uplink.

Specifically, the radio signal transmission/reception unit 210 can transmit/receive radio frames, sub-frames, slots and symbols shown in FIG. 2. The radio frames may include a UL frame and a DL frame. The uplink signals may include various UL channels (for example, PUSCH/PUCCH).

The radio signal transmission/reception unit 210 can transmit the UL frame in a state in which a start position (for example, a position of Slot #0) of the UL frame is shifted from a start position of the DL frame. The shift between the start position of the UL frame and the start position of the DL frame is referred to as Timing Advance (TA), and an amount of the shift (time difference) may be called as TA value (timing value).

The amplifier unit 220 includes a Power Amplifier (PA)/Low Noise Amplifier (LNA) or the like. The amplifier unit 220 amplifies a signal output from the modulation/demodulation unit 230 to a predetermined power level. The amplifier unit 220 amplifies a RF signal output from the radio signal transmission/reception unit 210.

The modulation/demodulation unit 230 performs data modulation/demodulation, transmission power setting, resource block allocation, and the like, for each predetermined communication destination (such as gNB 100). Cyclic Prefix-Orthogonal Frequency Division Multiplexing (CP-OFDM)/Discrete Fourier Transform-Spread (DFT-S-

OFDM) may be applied to the modulation/demodulation unit 230. DFT-S-OFDM may be used not only for the uplink (UL) but also for the downlink (DL).

The control signal/reference signal processing unit 240 performs processing related to various control signals transmitted/received by the UE 200 and various reference signals transmitted/received by the UE 200.

Specifically, the control signal/reference signal processing unit 240 receives various control signals transmitted from the gNB 100 through a predetermined control channel, for example, control signals of a radio resource control layer (RRC). Further, the control signal/reference signal processing unit 240 transmits various control signals to the gNB 100 through the predetermined control channel.

The control signal/reference signal processing unit 240 performs processing using a reference signal (RS) such as a Demodulation Reference Signal (DMRS) and a Phase Tracking Reference Signal (PTRS).

The DMRS is a reference signal (pilot signal) known between a terminal-specific base station and a terminal for estimating a fading channel used for data demodulation. The PTRS is a terminal-specific reference signal for estimating a phase noise, which is a problem in a high frequency band.

In addition to the DMRS and the PTRS, the reference signals may include a Channel State Information-Reference Signal (CSI-RS), a Sounding Reference Signal (SRS), a Positioning Reference Signal (PRS) for position information and the like.

Further, the channels may include a control channel and a data channel. The control channels may include a Physical Downlink Control Channel (PDCCH), a Physical Uplink Control Channel (PUCCH), a Random Access Channel (RACH), Downlink Control Information (DCI) including Random Access Radio Network Temporary Identifier (RA-RNTI), and a Physical Broadcast Channel (PBCH) and the like.

Further, Data channels include Physical Downlink Shared Channel (PDSCH), Physical Uplink Shared Channel (PUSCH), and the like. Data may mean data that is transmitted over a data channel.

Further, the control signal/reference signal processing unit 240 can transmit capability information indicating capability of the UE 200 (UE Capability Information) to a network. In particular, in the present embodiment, the control signal/reference signal processing unit 240 can transmit the capability information of the UE 200 concerning the configuration of the TA value (timing value) to the network. In the present embodiment, the control signal/reference signal processing unit 240 may constitute a transmitting unit that transmits the capability information of the terminal concerning the configuration of the timing value to the network.

Specifically, the control signal/reference signal processing unit 240 may include in the capability information whether or not a plurality of the TA values can be applied within a cell (which can be a serving cell or a Timing Advance Group (TAG)), a type such as parameter that can be used to determine the TA values, a maximum value of the TA values that can be configured, and the like. A method for reporting the capability information will be described below.

The encoding/decoding unit 250 performs data division/concatenation and channel coding/decoding for each predetermined communication destination (gNB 100 or other gNB).

Specifically, the encoding/decoding unit 250 divides the data output from the data transmission/reception unit 260 into predetermined sizes and performs channel coding for the divided data. The encoding/decoding unit 250 decodes the data output from the modulation/demodulation unit 230 and concatenates the decoded data.

The data transmission/reception unit 260 performs transmission/reception of a Protocol Data Unit (PDU) and a Service Data Unit (SDU). Specifically, the data transmission/reception unit 260 performs assembly/disassembly of the PDU/SDU in a plurality of layers (such as media access control layer (MAC), radio link control layer (RLC), packet data convergence protocol layer (PDCP)). The data transmission/reception unit 260 performs error correction and retransmission control of the data based on a hybrid automatic repeat request (ARQ).

The control unit 270 controls each function block constituting the UE 200. In particular, in the present embodiment, the control unit 270 controls transmission timing of the uplink signal.

Specifically, the control unit 270 can configure different TA values (timing values) for each of a plurality of uplink signals transmitted within the same cell (for example, cell C1 (see FIG. 2)).

The plurality of uplink signals may be interpreted as a Line of Sight (LOS) path from the UE 200 to the TRP 101 or the TRP 102 shown in FIG. 2. Here, the LOS path may include an uplink signal relayed (reflected) by the RIS 300 (or other structural objects such as buildings). The uplink signal may be read as (uplink) radio frame, sub-frame, slot, symbol, and the like.

"Within the same cell" may be interpreted as "within the same serving cell," or in the narrower sense, as "within the same TAG". That is, the control unit 270 may configure different TA values for each of the plurality of the uplink signals (such as radio frames) transmitted within the same serving cell (or the same TAG).

The TAG may be interpreted as a group identified by TAG identification information (TAG ID) and associated with a specific TA value. In this embodiment, the different TA values may be configured within the TAG (that is, the same TAG ID). Alternatively, a plurality of the TAG IDs may be assigned to one cell, and a plurality of TA values may be configured to one cell.

Further, the control unit 270 can configure the TA value of the uplink signal based on the reference signal (RS) referred to in transmission of the uplink signal. Specifically, the control unit 270 may determine the TA value of the uplink signal based on a state of the RS having the same or similar spatial relation. Alternatively, the control unit 270 may determine the TA value of the uplink signal based on the state of the RS referred to when calculating distance decay of the uplink signal. Alternatively, the control unit 270 may determine the TA value of the uplink signal based on the state of the RS referred to when calculating (configuring) a precoder. Specific examples of the RS used to determine the TA value will be described below.

Further, the control unit 270 may configure the TA value of the uplink signal based on the spatial relation with the uplink signal. That is, the control unit 270 may determine the TA value of the uplink signal based on the spatial relation between the uplink signal and the predetermined RS, and not the state of the RS. The spatial relation may mean, for example, that the UE 200 can transmit the uplink signal (specifically, such as PUCCH) using the same beam BM used to receive the corresponding downlink signal.

The control unit 270 may determine the TA value of the uplink signal based on a Transmission Configuration Indication (TCI) state that is configured to be Quasi Co-location (QCL) with the RS being in the spatial relation with the uplink signal.

The control unit 270 may also configure the TA value of the uplink signal based on a content of downlink control information (DCI) or the channel (PDCCH) that receives the DCI. Specifically, the control unit 270 may configure the TA value of the uplink signal based on a content of the DCI received from the network (gNB 100) or the channel (PDCCH) that receives the DCI.

The control unit 270 may configure different TA values for contents of specific fields included in the DCI, for example, for each pool index of control resource sets (CORESETs), for each DMRS port, or for each SRS resource indicator (SRI). Alternatively, the control unit 270 may configure the TA values based on values of dedicated bit fields included in the DCI.

The control unit 270 may configure different TA values for each destination of the uplink signal or for each transmission panel transmits that the uplink signal. Specifically, the control unit 270 may configure different TA values depending on the TRP (TRP 101 or TRP 102) that is the destination of the uplink signal. Alternatively, the control unit 270 may configure different TA values depending on the transmission panel (antenna panel) of the UE 200 that transmits the uplink signal.

The control unit 270 may configure different TA values for each time resource. Specifically, the control unit 270 may configure different TA values for each predetermined time (or period). The predetermined time (or period) may be, for example, a periodicity of an SSB (SS/PBCH Block) constituted by a Synchronization Signal (SS) and a Physical Broadcast Channel (PBCH), a repetition periodicity of a Time Division Duplex (TDD) pattern, a predetermined number of radio frames, slots, or symbols. A time resource to which the uplink signal is assigned may be used as reference.

(3) Operation of Radio Communication System

Next, an operation of the radio communication system 10 will be described. Specifically, a description is given regarding the operation related to configuring (determination) of the TA value when many LOS paths exist due to the introduction of the RIS 300 and multiple TRPs (Multi-TRPs).

(3.1) Assumption and Problem

Figure 5:
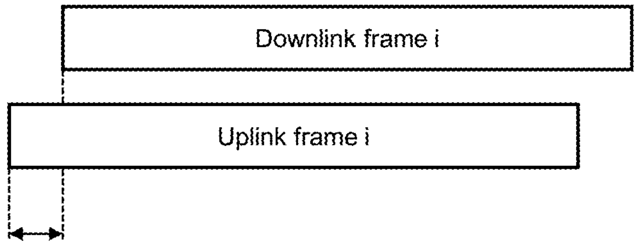
FIG. 5 is a diagram showing a configuration example of a TA value.

FIG. 5 shows a configuration example of the TA value. As shown in FIG. 5, the UE 200 can apply a TA that shifts the start position of the frame (radio frame) between the UL and DL.

In this embodiment, the TA value may be at least one of $N_{TA}$/$N_{TA, offset}$/$N_{TA}$+$N_{TA, offset}$/($N_{TA}$+$N_{TA, offset}$)$T_c$/TA offset, or a variable that determines these values. In a conventional specification of 3GPP (such as TS 38.211), $N_{TA}$ can be configured for each TAG, and $N_{TA, offset}$ can be configured for each serving cell, but in this embodiment, as described above, a plurality of TA values with different values can be configured even within the same TAG and/or the same serving cell. Note that $N_{TA}$ may indicate an amount of timing adjustment notified by MAC CE or RA Response, and $N_{TA, offset}$ may indicate the offset applied to $N_{TA}$. $T_c$ is a variable, and $N_{TA}$+$N_{TA, offset}$ can be multiplied by $T_c$. For example, $T_c$=0.509 ns may be provided.

As discussed above, the number of LOS paths can also increase when the RIS 300 and multiple TRPs (Multi-TRPs) are introduced. In particular, when transmitting and receiving highly directional signals amplified/reflected by the RIS 300 and the like, the delay may be large, but the received power may be sufficient.

However, in the conventional 3GPP specification, the TA value to which UE 200 is applicable is specific to the TAG, so that different TA values cannot be applied to the same cell (that may be interpreted as a serving cell). Therefore, it is possible that all of the paths cannot be included in the cyclic prefix (CP) length.

In the following operation example, these problems are solved, and the UE 200 configures a TA value corresponding to the transmission in multiple paths in the same cell.

(3.2) Operation Examples

In the following, operation examples 1 to 7 concerning the configuration of the TA value corresponding to the transmission in a plurality of paths within the same cell will be described.

(3.2.1) Operation Example 1

Figure 6:
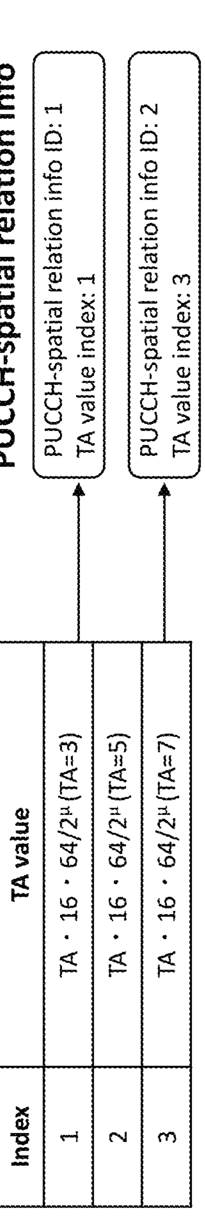
FIG. 6 is a diagram showing an example of correspondence among an Index, a TA value and a spatial relation of PUCCH according to operation example 1.

In this operation example, the UE 200 may configure a plurality of TA values in the same cell. FIG. 6 shows an example of correspondence among Index, TA value and spatial relation of PUCCH in operation example 1.

As shown in FIG. 6, the TA values with different values may be associated with Index 1 to 3. Specifically, different values of 3, 5, or 7 may be associated with parameter TA, and the TA values may be calculated by $TA \cdot 16 \cdot 64/2\mu$. TA denotes a variable, and u denotes the applied SCS. The TA value Index 1, 3 may be associated with the PUCCH-spatial relation info ID1, 2, respectively.

In addition, when the TA value can be configured for each X in the operation examples 2 to 6 described below, the UE 200 may configure the TA value as follows. For example, different TA values may be assigned to an Index (TA value Index), and the TA value Index applied for each X or for each group constituted by X may be configured for the UE 200 by signaling (such as RRC) of a higher layer.

In this case, the TA value Index may be configured for each TAG ID (a cell group with the same TA), or the TA value Index may be directly associated with the TAG ID.

Note that "X" may be, and is not particularly limited to, spatial information including predetermined time, resources (time, frequency, and space), TRP, RIS, number of LOS paths, RS, and spatial relation. Further, for each X, the TA value to be applied to the uplink signal may be determined. This can be read such that for each group composed of X, the TA value to be applied to the uplink signal may be determined (the same is applied hereinafter).

In addition, the UE 200 may support at least one of the following options.

(Opt. A): Absolute values of a plurality of the TA values are configured.

When a new TA value is additionally configured or an existing TA value is updated, the TA value is configured by an absolute value. For example, the UE 200 may receive the absolute value (and the TA value index) of a newly added TA value by the MAC CE (Control Element) from the gNB 100.

Alternatively, when a new TA value is additionally configured or an existing TA value is updated, the existing TA value may be referenced. For example, the UE 200 may receive a difference (and TA value index) between the newly added TA value by the MAC CE and the existing TA value from the gNB 100.

(Opt. B): A reference TA value (default TA value) is determined, and other TA values are determined by the difference from the reference TA value. According to this option, the TA value can be determined by a small number of bits, since it is expressed as a difference.

In this case, the reference TA value can be the TA value configured by the initial connection (RA Response) or the TA value configured by the MAC CE.

When a new TA value is additionally configured or an existing TA value is updated, a difference from the reference TA value may be configured. For example, the UE 200 may receive the difference (and TA value index) between the newly added TA value by the MAC CE and the default TA value from the gNB 100. Here, if the TA value to be applied to the transmitted uplink signal is not configured, the UE 200 may transmit the uplink signal by applying the reference TA value.

When a plurality of different TA value values are configured, the UE 200 may configure/update the TA value by the following options.

(Opt.1): The UE 200 receives a TA command containing a plurality of TA values and configures/updates the TA value.

For example, the UE 200 receives a TA command MAC CE containing a plurality of or all of the TA values and configures/updates the plurality of the TA values. According to this option, since the plurality of the TA values can be configured/updated by one MAC CE, resource utilization efficiency is high and delay can be suppressed.

(Opt.2): The UE 200 receives only the TA command containing one TA value and configures/updates the TA value. For example, the UE 200 receives the TA command MAC CE containing one TA value and configures/updates the TA value. This option allows the MAC CE configuration to be reduced to only one.

In addition, the UE 200 may deactivate the configured TA value. Specifically, the UE 200 may deactivate the TA value by the following options:

(Opt.1)—The UE 200 receives a MAC CE that cancels a configuration of a specific TA value and deactivates the configured TA value. In this case, if a MAC CE that cancels all but the default TA value is defined and such MAC CE is received, the UE 200 may cancel all TA value configurations except the default TA value.

(Opt.2): When the TA value is updated/configured in the initial connection, the configuration] of the previously configured TA value may be canceled. For example, the configuration of the previously configured TA value may be canceled only when the TA value is updated in the contention based random access procedure (CBRA) (An example eliminating the contention free random access procedure (CFRA)).

(3.2.2) Operation Example 2

In this example, the UE 200 may configure the TA value based on the reference signal (RS) referred to in uplink signal transmission. In other words, the TA value may be determined for each RS. Although the operation within the same cell (serving cell) may be assumed for the following operation examples including this operation example, the following operation examples including this operation example may not necessarily be limited to the same cell.

The UE 200 may determine which TA value is to be applied based on specification by the RRC, MAC CE, DCI, or the like, for each RS referred to in the uplink signal transmission or for each group composed of the referred RSs.

Figure 7:
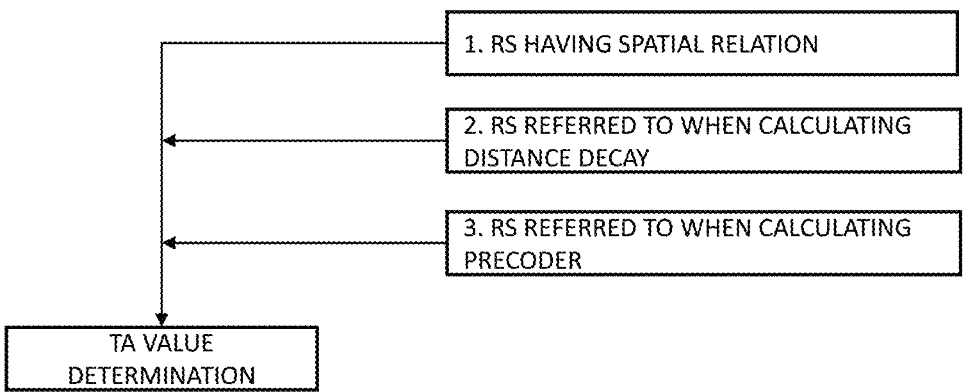
FIG. 7 is a diagram showing an example of a method for determining a TA value according to operation example 2.

FIG. 7 shows an example of a method for determining the TA value according to the operation example 2. As shown in FIG. 7, the UE 200 may determine the TA value by any of the following methods. However, it is not necessarily limited to these methods, and the TA value may be determined by other methods.

(Opt. 2-1): The UE 200 refers to the RS having a spatial relation, and applies the TA value configured for each relevant RS or for each relevant group composed of the RS to the uplink signal.

According to this option, in such a case that the spatial relation is different but means the same RS, such as a case that the spatial relation info of the PUCCH and the spatial relation info of the SRS are configured to the same RS, a plurality of the TA values can be configured with low overhead by configuring them for each RS.

For example, the UE 200 may determine the TA value by referring to the RS that the spatial relation during transmission of the PUSCH/PUCCH/SRS. The UE 200 may also refer to the RS to be QCL with the PDCCH to which the PUSCH/PUCCH/SRS resources are assigned, and determine the TA value during transmission of the uplink signal to which the resources are assigned.

In addition, the UE 200 may determine the TA value by referring to the RS having a spatial relation during transmission and the RS that is QCL (a relation sharing the same channel property among different antenna ports) that is connected by a TCI-state and the like. In this case, the UE 200 may determine the TA value by referring to the RS connected to a specific type of QCL.

The type of the QCL may be specified as follows (see Chapter 5.1.5 of 3GPP TS 38.214).

QCL-Type A: {Doppler shift, Doppler spread, average delay, delay spread}

QCL-Type B: {Doppler shift, Doppler spread}

QCL-Type C: {Doppler shift, average delay}

QCL-Type D: {Spatial Rx parameter}

(Opt. 2-2): The UE 200 may apply during transmission, a TA value configured for each RS or for each group composed of the RSs based on the RS referred to when calculating the distance decay.

According to this option, since the distance decay is highly correlated with the delay time, a plurality of the TA values can be configured as appropriate. For example, the UE 200 may determine the TA value by referring to the RS (for example, CSI-RS, SSB) referred to when calculating the distance decay for calculating the transmission power during transmission of PUCCH/PUSCH/SRS.

(Opt. 2-3): The UE 200 may apply the TA value configured for each relevant RS or for each relevant group composed of the RSs during transmission based on the RS referred to when calculating (configuring) the precoder.

According to this option, PUSCH transmission without spatial relation (non-codebook type PUSCH) can be also supported. For example, the UE 200 may determine the TA value by referring to the RS referred to when calculating the precoding matrix of non-codebook based SRS during transmission of the uplink signal.

(3.2.3) Operation Example 3

In this operation example, the UE 200 may configure the TA value based on the spatial relation with the uplink signal. In other words, the TA value may be determined for each spatial relation.

The UE 200 may determine which TA value is to be applied for each QCL relation/TCI-state/spatial relation or for each group composed of a plurality of QCL relations/TCI-state/spatial relations, based on the specification by RRC, MAC CE, DCI, and the like.

Figure 8:
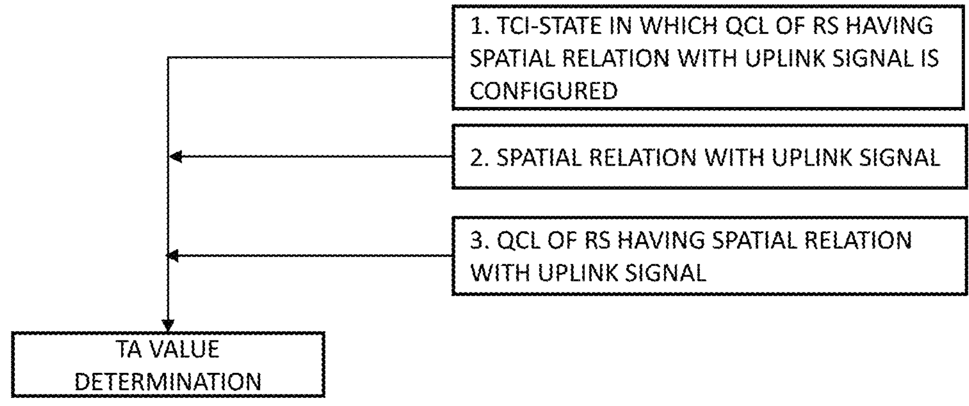
FIG. 8 is a diagram showing an example of a method for determining a TA value according to operation example 3.

FIG. 8 shows an example of a method for determining the TA value according to the operation example 3. As shown in FIG. 8, the UE 200 may determine the TA value by any of the following methods. However, it is not necessarily limited to these methods, and the TA value may be determined by other methods.

(Opt. 3-1): The UE 200 determines the TA value based on TCI-state in which the QCL of the RS having the spatial relation with the uplink signal is configured.

According to this option, when specific RSs are in the QCL relation with each other, a plurality of TA values can be configured as due to the appropriate same channel characteristics of the relevant RS. In this case, the RS referred to in the operation example 1 may be applied instead of the "RS having a spatially relation with the uplink signal".

(Opt. 3-2): The UE 200 determines the TA value based on the spatial relationship with the uplink signal.

According to this option, a plurality of the TA values can be configured as appropriate, since the spatial characteristics of the transmitted signal are determined depending on the spatial relation. For example, the UE 200 may determine the TA value by referring to the spatial relation of the uplink signal or the spatial relation of the RS, which has a QCL type D relation with the uplink signal.

(Opt. 3-3): The UE 200 determines the TA value based on the QCL of the RS having the spatial relation with the uplink signal.

According to this option, when specific RSs are in the QCL relation with each other, a plurality of the TA values can be configured as appropriate due to the same channel characteristics of the relevant RS. In this case, the RS referred to in operation example 1 may be applied instead of the "RS having the spatial relation with the uplink signal."

(3.2.4) Operation Example 4

In this operation example, the UE 200 may configure the TA value based on the downlink control information (DCI). Specifically, the UE 200 may determine the TA value to be applied to the uplink signal based on the received DCI configuration.

Figure 9:
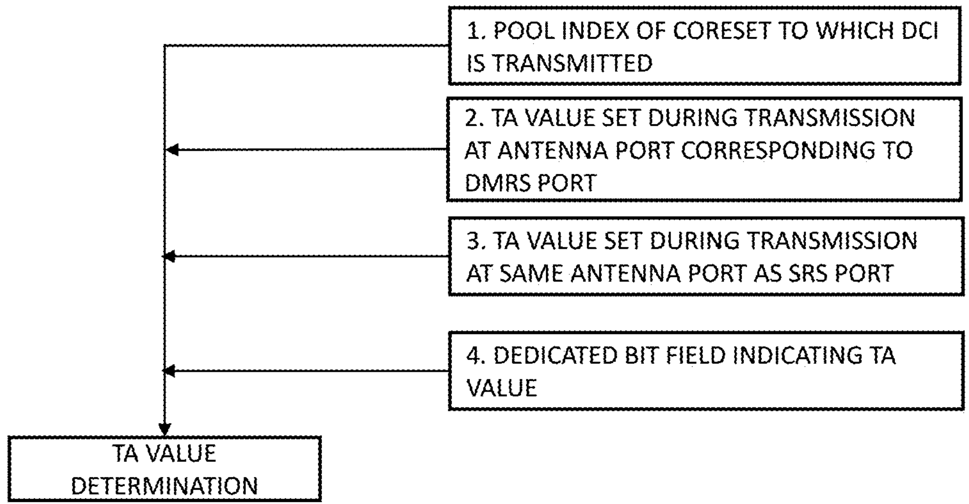
FIG. 9 is a diagram showing an example of a method for determining a TA value according to operation example 4.

FIG. 9 shows an example of a method for determining the TA value according to the operation example 4. As shown in FIG. 9, the UE 200 may determine the TA value by any of the following methods. However, it is not necessarily limited to these methods, and the TA value may be determined by other methods.

(Opt. 4-1): The TA value for each CORESET pool index is configured, and the UE 200 may, during transmission of the uplink signal, determine the TA value based on the pool index of the CORESET to which the DCI for scheduling the relevant uplink signal is transmitted.

According to this option, a plurality of the TA values can be configured with low overhead. Note that the UE 200 may determine the TA value based on the parameter specified by the DCI.

(Opt. 4-2): The TA value is configured for each DMRS port, and the UE 200 may apply the TA value configured during transmission at the antenna port corresponding to the DMRS port specified by the DCI to the uplink signal.

According to this option, the TA value can be configured for each layer during MIMO transmission.

(Opt. 4-3): The TA value is configured for each SRS resource indicator (SRI), and the UE 200 may apply the TA value configured during transmission at the same antenna port as the SRS port of the SRS resource specified by the SRI of the DCI to the uplink signal.

If a plurality of SRI fields can be configured, and the TA value is configured for each SRI field, the UE 200 may apply the TA value configured during transmission at the same antenna port as the SRS port of the SRS resource specified by each SRI field to the uplink signal (Multi-TRP with single DCI may be intended). This allows for PUSCH transmission that may not be accompanied by a spatial relation such as a non-codebook type.

(Opt. 4-4): UE 200 determines the TA value based on a dedicated bit field in the DCI indicating the TA value to be applied.

In this case, the UE 200 determines the TA value for each antenna port from the dedicated bit field and may apply a different TA value for each antenna port. According to this option, the degrees of freedom is highly flexible and the TA value can be configured for each MIMO layer.

(3.2.5) Operation Example 5

In this operation example, the UE 200 may configure the TA value depending on the destination of the uplink signal or the transmission panel that transmits the uplink signal. Specifically, the UE 200 may determine the TA value to be applied to the uplink signal depending on the destination of the uplink signal (TRP) or the transmission panel that transmits the uplink signal.

Figure 10:
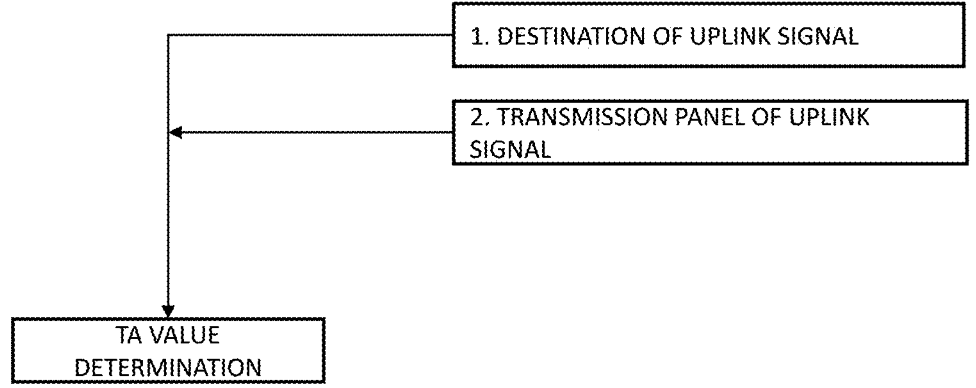
FIG. 10 is a diagram showing an example of a method for determining a TA value according to operation example 5.

FIG. 10 shows an example of a method for determining the TA value according to the operation example 5. As shown in FIG. 10, the UE 200 may determine the TA value by any of the following methods. However, it is not necessarily limited to these methods, and the TA value may be determined by other methods.

(Opt. 5-1): The UE 200 determines the TA value based on the destination of the uplink signal.

According to this option, a plurality of the TA values can be configured as appropriate based on a physical environment. For example, different TA values may be applied depending on the beam BM directed by the UE 200 when transmitting. If it can be judged whether the UE 200 is an uplink signal through the RIS 300, the UE 200 may apply different TA values depending on whether it is through the RIS 300. Furthermore, if it can be judged which TRP (panel) the UE 200 is transmitting to, the UE 200 may apply different TA values for each TRP (panel).

(Opt. 5-2): The UE 200 determines the TA value depending on the transmitting panel.

According to this option, a plurality of the TA values depending on a position of the transmitting panel can be configured as appropriate. For example, the UE 200 may apply a different TA value for each TRP (panel) that transmits an uplink signal.

(3.2.6) Operation Example 6

In this example, the UE 200 may configure a TA value for each time resource. For example, the UE 200 may configure a TA value for each time resource to which an uplink signal is assigned.

Figure 11:
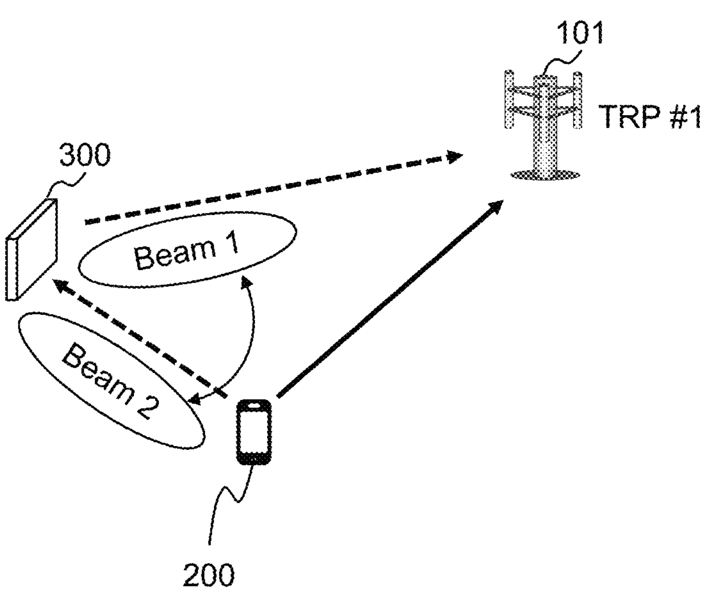
FIG. 11 is a diagram showing a configuration example of a path between UE 200 and a transmission/reception point (TRP) according to operation example 6.

FIG. 11 shows a configuration example of a path between the UE 200 and a transmission/reception point (TRP) according to the operation example 6. When beams (beam 1, 2) of the RIS 300 are periodically switched, the UE 200 may change the TA value (that is, configured the TA value to a different value) in accordance with the period.

According to this operation example, the affinity with the RIS 300 in which the beams semi-statically change is high. For example, the UE 200 may configure the TA value at a fixed time/period (for example, SSB periodicity, TDD pattern, predetermined number of radio frames/slots/symbols, and the like) and apply the TA value configured within an interval including a transmission occasion of the relevant uplink signal.

In this case, the UE 200 may apply any of the following TA values when one transmission occasion overlaps a plurality of periods in which different TA values are configured.

- (Opt.1): TA value corresponding to a first (or last) overlapped period
- (Opt.2): TA value corresponding to a longest overlapped period
- (Opt.3): TA value different for each period within the transmission occasion (3.2.7) Operation Example 7

In this operation example, the UE 200 may report the UE Capability Information of the UE 200 on the configuration of the TA value to the network.

Specifically, the UE 200 may report the following capability information:

- Applicability of a plurality of the TA values in a cell
- Possibility to perform each TA value determination method according to the operation examples 2 to 6, and whether or not options for each operation example are supported
- Maximum TA value that can be configured by the UE 200
- Maximum TA value per 1CC/1TAG/1 cell group that can be configured by UE the 200

The UE 200 may report the corresponding (supported) frequency (which may be a frequency range (FR) or a band) of the capability information described above by any of the following methods.

- Whether all frequencies are supported (whether the UE 200 can provide a support).
- Whether each frequency is supported
- Whether each FR (each FR1/FR2 or each FR1/FR2-1/FR2-2) is supported
- Whether each SCS is supported Further, the UE 200 may report the corresponding duplex method by any of the following methods.

- Whether the UE 200 can provide a support
- Whether each duplex (TDD/FDD) can be supported (4) Operations and Effects According to the above-described embodiment, the following operations and effects can be obtained. Specifically, the UE 200 can configure different TA values (timing values) for a plurality of the uplink signals transmitted within the same cell (for example, cell C1). Therefore, even when the LOS path increases due to the introduction of the RIS 300 and the Multi-TRP, an appropriate TA value can be configured for an uplink signal such as PUSCH transmitted through one of the plurality of paths.

In this embodiment, the UE 200 can configure the TA value of the uplink signal based on the reference signal (RS) referred to in the transmission of the uplink signal. The UE 200 may configure the TA value of the uplink signal based on the spatial relation with the uplink signal. Further, the UE 200 may configure the TA value of the uplink signal.

In this embodiment, the UE 200 may configure a different TA value for each destination of the uplink signal or for each transmission panel that transmits the uplink signal. The UE 200 may configure a different TA value for each time resource. Further, the UE 200 may configure the TA value of the uplink signal based on the content of the downlink control information (DCI).

According to the UE 200, an appropriate TA value can be specifically configured for a plurality of LOS paths, so that an appropriate TA value that falls within the CP can be configured even when the LOS path increases.

(5) Other Embodiments

Although the embodiments have been described above, they are not limited to the description of the embodiments, and it is obvious to those skilled in the art that various modifications and improvements can be made.

For example, in the embodiments described above, the uplink signal is described as corresponding to a radio frame, a sub-frame, a slot, a symbol, or the like. However, as described above, various UL channels (for example, PUSCH/PUCCH) may be included, and may be read as a data unit transmitted through the relevant UL channel, and the like.

In addition, in the embodiments described above, an example in which the TA value corresponds to a timing value for determining the transmission timing of the uplink signal has been described, but it may not necessarily be limited to the TA as long as the start timing of the uplink signal and the downlink signal (radio frame) can be mutually recognized.

In the description described above, "configure," "activate," "update," "indicate," "enable," "specify," and "elect" may be interchangeably read. Similarly, link, associate, correspond, and map may be interchangeably read, and allocate, assign, monitor, and map may be also interchangeably read.

In addition, specific, dedicated, UE-specific, and UE-dedicated may be interchangeably read. Similarly, common, shared, group-common, UE-common, and UE-shared may be interchangeably read.

In the present disclosure, terms such as "precoding," "precoder," "weight (precoding weight)," "Quasi Co-Location (QCL)," "Transmission Configuration Indication state (TCI state)," "spatial relation," "spatial domain filter," "transmitting power," "phase rotation," "antenna port," "antenna port group," "layer," "number of layers," "rank," "resource," "resource set," "resource group", "beam," "beam width," "beam angle," "antenna," "antenna element," "panel," and the like may be interchangeably used.

In addition, the block diagram (FIG. 4) used in the description of the above-described embodiment shows blocks of functional units. These functional blocks (configurations) are realized by any combination of at least one of hardware and software. Further, the method of realizing each functional block is not particularly limited. That is, each functional block may be implemented using a single device that is physically or logically coupled, or two or more devices that are physically or logically separated may be directly or indirectly (for example, using wire or wirelessly) connected and implemented using these multiple devices. The functional block may be implemented using the single device or a combination of the multiple devices and software.

The functions include, but are not limited to, determining, deciding, judging, calculating, computing, processing, deriving, investigating, searching, ascertaining, receiving, transmitting, outputting, accessing, resolving, choosing, selecting, establishing, comparing, assuming, expecting, considering, broadcasting, notifying, communicating, forwarding, configuring, reconfiguring, allocating or mapping, and assigning. For example, the function blocks (components) that having a function of transmitting are called transmitting units and transmitters. In all cases, the method of realization is not particularly limited as described above.

Figure 12:
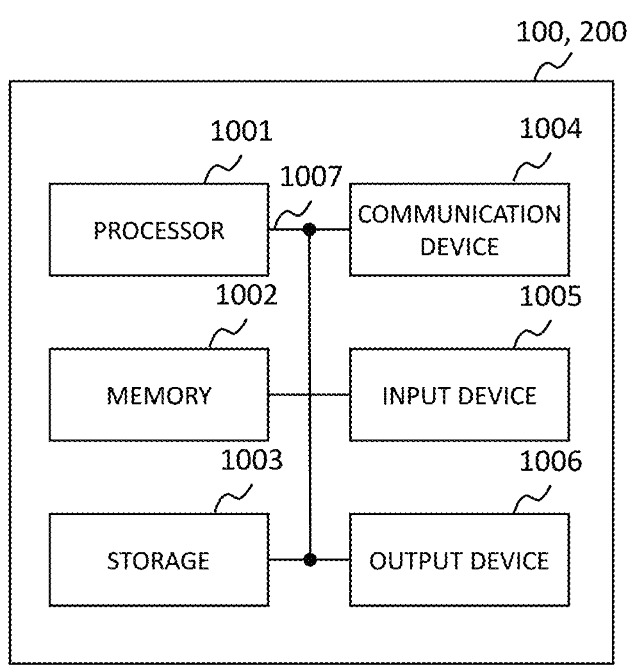
FIG. 12 is a diagram showing an example of a hardware configuration of a gNB 100 and a UE 200.

In addition, the above-mentioned gNB 100 and UE 200 (the device) may function as a computer for processing the radio communication method of the present disclosure. FIG. 12 is a diagram showing an example of a hardware configuration of the device. As shown in FIG. 12, the device may be configured as a computer device including a processor 1001, a memory 1002, a storage 1003, a communication device 1004, an input device 1005, an output device 1006 and a bus 1007.

In the following description, the term “device” can be read as a circuit, unit, or the like. The hardware configuration of the device may include one or more of the devices shown in the drawings, or may not include some of the devices.

Each functional block of the device (see FIG. 4) is implemented by any hardware element of the computer device, or a combination of the hardware elements.

Each functional block of the device is implemented by loading predetermined software (programs) onto hardware, such as the processor 1001 and the memory 1002, so that the processor 1001 performs operations to control communication by the communication device 1004, or to control at least one of data reading and writing in the memory 1002 and the storage 1003.

The processor 1001, for example, operates an operating system to control the entire computer. The processor 1001 may include a central processing unit (CPU) including interfaces to peripheral devices, control devices, operation devices, registers, or the like.

Further, the processor 1001 reads programs (program codes), software modules, data, and the like from at least one of the storage 1003 and the communication device 1004 into the memory 1002, and performs various processes accordingly. A program for causing a computer to perform at least a part of the operation described in the above embodiment is used as a program. Further, the various processes described above may be performed by one processor 1001 or may be simultaneously or sequentially by two or more processors 1001. The processor 1001 may be implemented by one or more chips. The program may be transmitted from the network through a telecommunications line.

The memory 1002 is a computer-readable storage medium and may include at least one of, for example, Read Only Memory (ROM), Erasable Programmable ROM (EPROM), Electrically Erasable Programmable ROM (EEPROM), Random Access Memory (RAM), and the like. The memory 1002 may be referred to as a register, cache, main memory (main storage), and the like. The memory 1002 may store programs (program codes), software modules, and the like, which can perform the method according to one embodiment of the present disclosure.

The storage 1003 is a computer-readable storage medium and may include at least one of, for example, an optical disk such as a Compact Disc ROM (CD-ROM), a hard disk drive, a flexible disk, a magneto-optical disk (for example, compact discs, digital versatile discs, and Blu-ray (Registered trademark) discs), a smart card, a flash memory (for example, cards, sticks, and key drives), a floppy disk (Registered trademark), or a magnetic strip. The storage 1003 may be referred to as an auxiliary storage device. The storage medium described above may be, for example, a database, server or other suitable medium including at least one of the memory 1002 and the storage 1003.

The communication device 1004 is hardware (transmission/reception device) for communicating between computers through at least one of a wired network and a radio network, and may also be referred to as, for example, a network device, a network controller, a network card or a communication module.

The communication device 1004 may include, for example, a high-frequency switch, a duplexer, a filter, a frequency synthesizer and the like for implementing at least one of frequency division duplex (FDD) and time division duplex (TDD).

The input device 1005 is an input device (for example, keyboards, mice, microphones, switches, buttons, sensors, and the like) that receives input from outside. The output device 1006 is an output device (for example, displays, speakers, LED lamps, and the like) that performs output to the outside. The input device 1005 and the output device 1006 may be an integrated component (for example, a touch panel).

Each device, such as the processor 1001 and the memory 1002, is connected by a bus 1007 for communicating information. The bus 1007 may be configured using a single bus or a different bus for each device.

In addition, the device may include hardware such as a microprocessor, a Digital Processor an Signal (DSP), Application Specific Integrated Circuit (ASIC), a Programmable Logic Device (PLD), a Field Programmable Gate Array (FPGA), and the like, and the hardware may realize some or all of each functional block. For example, the processor 1001 may be implemented using at least one of these hardware components.

Notification of information is not limited to the aspects/embodiments described in the present disclosure and may be made using other methods. For example, the notification of information may be performed by physical layer signaling (for example, Downlink Control Information (DCI), Uplink Control Information (UCI), higher layer signaling (for example, RRC signaling, Medium Access Control (MAC) signaling, broadcast information (Master Information Block (MIB), System Information Block (SIB)), other signals, or a combination thereof. RRC signaling may also be referred to as RRC messages, and may be, for example, RRC Connection Setup messages, RRC Connection Reconfiguration messages, and the like.

Each of the aspects/embodiments described in the present disclosure may apply to at least one of systems utilizing Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-Wide Band (UWB), Bluetooth (registered trademark), or any other suitable system, and next-generation systems extended based on these systems. In addition, a plurality of systems may be combined and applied (for example, combination of at least one of LTE and LTE-A with 5G and the like).

The processing procedures, sequences, flowcharts, and the like of each of the aspects/embodiments described in the present disclosure may be reordered as long as there is no contradiction. For example, the method described in the present disclosure presents elements of various steps using an exemplary order and is not limited to any particular order that is presented.

The specific operation performed by the base station in the present disclosure may in some cases be performed by its upper node. It is apparent that in a network consisting of one or more network nodes having a base station, various operations performed for communication with a terminal may be performed by at least one of the base station and other network nodes (examples include, but are not limited to, MME or S-GW) other than the base station. Although the case of one other network node other than the base station is illustrated above, it may be a combination of multiple other network nodes (for example, MME and S-GW).

Information and signals (such as information) may be output from a higher layer (or a lower layer) to a lower layer (or a higher layer). They may be input and output through a plurality of network nodes.

The input and output information may be stored in a specific location (for example, memory) or may be managed using a management table. The input and output information may be overwritten, updated, or added. The output information may be deleted. The input information may be transmitted to another device.

The judgement may be based on a value represented by a single bit (0 or 1), a true or false value (Boolean: true or false), or a numeric comparison (for example, comparison with a given value).

Each of the aspects/embodiments described in the present disclosure may be used alone, in combination, or alternatively in execution. The notifications (for example, "being X" notification) of predetermined information are not limited to those performed explicitly, but may be performed implicitly (for example, notification of the predetermined information is not given).

Software should be broadly interpreted to mean instructions, instruction sets, codes, code segments, program codes, programs, subprograms, software modules, applications, software applications, software packages, routines, subroutines, objects, executable files, execution threads, procedures, functions, and the like, whether referred to as software, firmware, middleware, microcode, hardware description language, or by any other name.

Software, instructions, information, and the like may also be transmitted and received through a transmission medium. For example, when software is transmitted from a website, server, or other remote source using at least one of wired technology (Coaxial cables, optical fiber cables, twisted pairs, or Digital Subscriber Line (DSL)) and radio technology (such as infrared, microwave), at least one of the wired and radio technologies is included in the definition of a transmission medium.

The information, signals, and the like described in the present disclosure may be represented using any of a variety of different techniques. For example, data, instructions, commands, information, signals, bits, symbols, chips, and the like which may be referred to throughout the description above may be represented by voltage, current, electromagnetic waves, magnetic fields or magnetic particles, optical fields or photons, or any combination thereof.

The terms described in the present disclosure and those necessary for understanding the present disclosure may be replaced with terms having the same or similar meanings. For example, at least one of the channels and symbols may be a signal (signaling). The signal may also be a message. The component carrier (CC) may also be referred to as a carrier frequency, a cell, a frequency carrier, and the like.

The terms "system" and "network" as used herein are used interchangeably.

The information, parameters, and the like described in the present disclosure may be expressed using absolute values, values relative to a predetermined value, or other corresponding information. For example, the radio resource may be indicated by an index.

The names used for the parameters described above are not restrictive in any respect. In addition, mathematical expressions or the like using these parameters may differ from those explicitly disclosed in the present disclosure. Since the various channels (Examples includes PUCCH, PDCCH.) and information elements can be identified by any suitable name, the various names assigned to these various channels and information elements are not in any way restrictive.

In the present disclosure, terms such as "base station (BS)," "radio base station," "fixed station," "Node B," "eNode B (eNB)," "gNode B (gNB)," "access point," "transmission point," "reception point," "transmission/reception point," "cell," "sector," "cell group," "carrier," "component carrier," and the like may be used interchangeably. A base station may also be referred to by terms such as macrocell, small cell, femtocell, picocell, and the like.

The base station may contain one or more (for example, three) cells, also called sectors. When the base station contains multiple cells, the entire coverage area of the base station may be divided into multiple smaller areas, each smaller area may also be provided with communication services by a base station subsystem (for example, a small indoor base station (Remote Radio Head: RRH)).

The term "cell" or "sector" refers to a part of or an entire coverage area of at least one of the base station and base station subsystem that provides communication services in this coverage.

In the present disclosure, terms such as "mobile station (MS)," "user terminal," "user equipment (UE)," and "terminal" may be used interchangeably.

A mobile station may be referred to as a subscriber station, mobile unit, subscriber unit, radio unit, remote unit, mobile device, radio device, radio communication device, remote device, mobile subscriber station, access terminal, mobile terminal, radio terminal, remote terminal, handset, user agent, mobile client, client, or some other appropriate terms by those skilled in the art.

At least one of the base station and the mobile station may be referred to as a transmitting device, receiving device, communication device, and the like. At least one of the base station and the mobile station may be a device mounted on a mobile body, the mobile body itself, and the like. The mobile body may be a vehicle (for example, cars, airplanes, and the like), an unmanned mobile body (for example, drones, self-driving cars, and the like), or a robot (manned type or unmanned type). It should be noted that at least one of the base station and the mobile station includes a device that does not necessarily move during communication operation. For example, at least one of the base station and the mobile station may be an Internet of Things (IoT) device such as a sensor.

The base station in the present disclosure may be read as a mobile station (user terminal, the same applies hereinafter). For example, each aspect/embodiment of the present disclosure may be applied to a configuration in which communication between a base station and a mobile station is replaced by communication between a plurality of mobile stations (for example, it may be called device-to-device (D2D), vehicle-to-everything (V2X), and the like). In this case, the mobile station may have the functions that the base station has. Further, phrases such as "uplink" and "downlink" may be replaced with phrases corresponding to communication between terminals (for example, "side"). For example, an uplink channel, a downlink channel, and the like may be replaced by the side channel.

Similarly, the mobile station in the present disclosure may be read as the base station. In this case, the base station may have the functions that the mobile station has.

The radio frame may be composed of one or more frames in the time domain. Each frame of the one or more frames in the time domain may be referred to as sub-frame. The sub-frames may also be composed of one or more slots in the time domain. The sub-frames may be composed of a fixed time length (for example, 1 ms) independent of numerology.

The numerology may be a communication parameter applied to at least one of the transmission and reception of a signal or channel. The numerology may indicate, for example, at least one of Subcarrier Spacing (SCS), bandwidth, symbol length, cyclic prefix length, transmission time interval (TTI), the number of symbols per TTI, radio frame configuration, specific filtering processes performed by a transceiver in the frequency domain, specific windowing processes performed by the transceiver in the time domain, and the like.

The slot may be comprised of one or more symbols (Orthogonal Frequency Division Multiplexing (OFDM) symbols, Single Carrier Frequency Division Multiple Access (SC-FDMA) symbols, and the like) in the time domain. The slot may be a time unit based on numerology.

The slot may include a plurality of mini-slots. Each mini-slot may be composed of one or more symbols in the time domain. The mini-slots may also be referred to as sub-slots. The mini-slots may be composed of fewer symbols than the slots. PDSCH (or PUSCH) transmitted in a time unit greater than the mini-slots may be referred to as PDSCH (or PUSCH) mapping type A. The PDSCH (or PUSCH) transmitted using the mini-slot may be referred to as the PDSCH (or PUSCH) mapping type B.

Radio frames, sub-frames, slots, mini-slots and symbols all represent time units in which signals are transmitted. Radio frames, sub-frames, slots, mini-slots and symbols may be given different names correspondingly.

For example, one sub-frame may be referred to as a transmission time interval (TTI), multiple consecutive sub-frames may be referred to as a TTI, and one slot or mini-slot may be referred to as a TTI. That is, at least one of the sub-frames and the TTI may be a sub-frame in an existing LTE (1 ms), a period shorter than 1 ms (for example, 1-13 symbols), or a period longer than 1 ms. The unit representing the TTI may be called a slot, a mini-slot, or the like, rather than a sub-frame.

Here, the TTI refers to, for example, the minimum time unit for scheduling in radio communication. For example, in the LTE system, the base station schedules for each user terminal to assign radio resources (such as frequency bandwidth and transmission power, which are usable at each user terminal) in units of TTI. The definition of TTI is not limited to this.

The TTI may be a transmission time unit such as a channel-encoded data packet (transport block), a code block, a code word, or a processing unit such as scheduling or link adaptation. When the TTI is given, the time interval (for example, the number of symbols) to which the transport block, code block, code word, or the like are actually mapped may be shorter than the TTI.

When one slot or one mini-slot is called a TTI, one or more TTIs (that is, one or more slots or one or more mini-slots) may be a minimum time unit for scheduling. The number of slots constituting the minimum time unit for the scheduling (the number of mini-slots) may be controlled.

TTIs having a time length of 1 ms may be referred to as regular TTIS (TTI in LTE Rel. 8-12), normal TTIs, long TTIs, regular sub-frames, normal sub-frames, long sub-frames, slots, and the like. The TTI that is shorter than the regular TTI may be referred to as a shortened TTI, short TTI, partial or fractional TTI, shortened sub-frame, short sub-frame, mini-slot, sub-slot, slot, or the like.

The long TTI (for example, regular TTI, sub-frame, and the like) may be read as the TTI having a time length exceeding 1 ms, and the short TTI (for example, shortened TTI and the like) may be read as the TTI having a TTI length less than the TTI length of the long TTI and greater than 1 ms.

A resource block (RB) is a resource assigning unit in the time domain and the frequency domain, and may include one or more consecutive subcarriers in the frequency domain. The number of subcarriers included in the RB may be the same regardless of the numerology, for example, twelve. The number of subcarriers included in the RB may be determined based on the numerology.

The time domain of the RB may also include one or more symbols and may be one slot, one mini-slot, one sub-frame, or one TTI in length. The one TTI, one sub-frame, and the like may each be composed of one or more resource blocks.

Note that one or more RBs may be referred to as Physical Resource Blocks (Physical RBs, PRBs), Sub-Carrier Groups (SCGs), Resource Element Groups (REGs), PRB pairs, RB pairs, and the like.

The resource blocks may be composed of one or more resource elements (REs). For example, the 1RE may be a radio resource area of one subcarrier and one symbol.

The Bandwidth Part (BWP) (may be referred to as partial bandwidth or the like) may represent a subset of consecutive common resource blocks (RBs) for a numerology on a carrier. Here, the common RBs may be specified by an index of the RBs based on a common reference point of the carrier. The PRBs may be defined in a BWP and numbered within the BWP.

The BWP may include a BWP for UL (UL BWP) and a BWP for DL (DL BWP). For the UE, one or more BWPs may be configured in one carrier.

At least one of the configured BWPs may be active and the UE may not assume to transmit or receive a predetermined signal/channel outside the active BWP. Note that "cell," "carrier," and the like in the present disclosure may be read as "BWP."

The structure of the radio frame, sub-frame, slot, mini-slot and symbol described above is only illustrative. For example, the number of sub-frames included in the radio frame, the number of slots per sub-frame or radio frame, the number of mini-slots included in the slot, the number of symbols and RBs included in the slot or mini-slot, the number of subcarriers included in the RB, the number of symbols in the TTI, the symbol length, the cyclic prefix (CP) length, and the like can be varied.

The terms "connected" and "coupled," or any variation thereof, mean any direct or indirect connection or coupling between two or more elements, and can include the presence of one or more intermediate elements between two elements "connected" or "coupled" to each other. Coupling or connection between elements may be physical, logical, or a combination thereof. For example, "connection" may be read as "access." As used in the present disclosure, the two elements may be considered to be "connected" or "coupled" to each other using at least one of one or more wires, cables, and printed electrical connections and, as some non-limiting and non-inclusive examples, electromagnetic energy having wavelengths in the radio frequency, microwave, and light (both visible and invisible) domains.

The reference signal may also be abbreviated as a Reference Signal (RS) and may be referred to as a Pilot by applicable standards.

As used in the present disclosure, the term "based on" does not mean "only based on" unless otherwise specified. In other words, the term "based on" means both "only based on" and "at least based on."

The term "means" in the configuration of each device described above may be replaced by "units," "circuits," "devices," and the like.

Any reference to elements using a designation such as "first," "second," or the like used in the present disclosure generally does not limit the quantity or order of those elements. Such designations may be used in the present disclosure as a convenient way to distinguish between two or more elements. Thus, reference to the first and second elements does not mean that only two elements may be employed therein, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive OR.

In the present disclosure, if articles are added by translation, for example, "a," "an" and "the" in English, the present disclosure may include that the noun following these articles is plural.

As used in the present disclosure, the term "determining" may encompass a wide variety of actions. The term "determining" may include deeming that determining has been performed by, for example, judging, calculating, computing, processing, deriving, investigating, searching (looking up, search, inquiry) (for example, searching in tables, databases, or other data structures), ascertaining and the like. Further, the term "determining" may include deeming that determining has been performed by receiving (for example, receiving information), transmitting (for example, transmitting information), inputting (input), outputting (output), access (accessing) (for example, accessing data in memory), and the like. Thus the term "determining" may include deeming that determining has been performed by resolving, selecting, choosing, establishing, comparing, and the like. In other words, the term "determining" may include deeming that "determining" regarding some action has been performed. The term "determining" may be read as "assuming," "expecting," "considering," and the like.

In the present disclosure, the term "A and B are different" may mean "A and B are different from each other." The term may also mean "A and B are different from C." Terms such as "separate" and "combined" may be interpreted in the same manner as "different."

Although the present disclosure has been described in detail, it is clear to those skilled in the art that the present disclosure is not limited to the embodiments described herein. The present disclosure may be implemented in a corrected and modified manner without departing from the spirit and scope of the present disclosure as determined by the description of the scope of claims. Accordingly, the description of the present disclosure is for illustrative purposes and does not have any restrictive meaning to the present disclosure.

EXPLANATIONS OF REFERENCES

10 Radio Communication System
20 NG-RAN
100 gNB
101, 102 TRP
200 UE
210 Radio signal transmission/reception unit
220 Amplifier unit
230 Modulation and Demodulation unit
240 Control signal/reference signal processing unit
250 Encoding/decoding unit
260 Data transmission/reception unit
270 Control unit
300 RIS
1001 Processor
1002 Memory
1003 Storage
1004 Communication device
1005 Input device
1006 Output device
1007 Bus

What is claimed is:

1. A terminal comprising:

a transmitter configured to transmit capability information indicating a capability to apply, to one serving cell, a plurality of timing values each configured for each of a plurality of timing advance groups;

a receiver configured to receive higher layer signaling configuring the plurality of timing values for the plurality of timing advance groups assigned to the one serving cell; and a controller configured to control, for a plurality of transmission and reception points (TRPs) forming the one serving cell, a transmission timing of an uplink signal directed to each of the TRPs using a different timing value among the plurality of timing values configured by the higher layer signaling, wherein in a case where the different timing value is set per CORESET pool index of a control resource set (CORESET), the transmitter is configured to transmit the uplink signal through an uplink using a timing value based on the CORESET pool index of the CORESET in which downlink control information (DCI) scheduling the uplink signal was transmitted.

2. A communication method for a terminal, comprising:

transmitting capability information indicating a capability to apply, to one serving cell, a plurality of timing values each set for each of a plurality of timing advance groups;

receiving higher layer signaling configuring the plurality of timing values for the plurality of timing advance groups assigned to the one serving cell;

controlling, for a plurality of transmission and reception points (TRPs) forming the one serving cell, a transmission timing of an uplink signal directed to each of the TRPs using a different timing value among the plurality of timing values configured by the higher layer signaling; and in a case where the different timing value is set per CORESET pool index of a control resource set (CORESET), transmitting the uplink signal through an uplink using a timing value based on the CORESET pool index of the CORESET in which downlink control information (DCI) scheduling the uplink signal was transmitted.

3. A base station comprising:

a receiver configured to receive from a terminal, capability information indicating a capability to apply, to one serving cell, a plurality of timing values each configured for each of a plurality of timing advance groups; and a transmitter configured to transmit to the terminal, higher layer signaling configuring the plurality of timing values for the plurality of timing advance groups assigned to the one serving cell, wherein the receiver is configured to receive through an uplink, an uplink signal directed to each of a plurality of transmission and reception points (TRPs) forming the one serving cell, for which a transmission timing is controlled using a different timing value among the plurality of timing values set by the higher layer signaling, and in a case where the different timing value is set per CORESET pool index of a control resource set (CORESET), the uplink signal is transmitted from the terminal using a timing value based on the CORESET pool index of the CORESET in which downlink control information (DCI) scheduling the uplink signal was transmitted.

4. A communication system comprising a radio base station and a terminal, the radio base station comprising:

a receiver configured to receive from a terminal, capability information indicating a capability to apply, to one serving cell, a plurality of timing values each configured for each of a plurality of timing advance groups; and a transmitter configured to transmit to the terminal, higher layer signaling configuring the plurality of timing values for the plurality of timing advance groups assigned to the one serving cell, the terminal comprising:

a transmitter configured to transmit the capability information to the radio base station, a receiver configured to receive the higher layer signaling, and a controller configured to control, for a plurality of transmission and reception points (TRPs) forming the one serving cell, a transmission timing of an uplink signal directed to each of the TRPs using a different timing value among the plurality of timing values configured by the higher layer signaling, wherein in a case where the different timing value is set per CORESET pool index of a control resource set (CORESET), the transmitter of the terminal is configured to transmit the uplink signal to the radio base station through an uplink using a timing value based on the CORESET pool index of the CORESET in which downlink control information (DCI) scheduling the uplink signal was transmitted.

* * * * *